United States Patent
Tang et al.

(10) Patent No.: US 11,292,215 B2
(45) Date of Patent: Apr. 5, 2022

(54) COATING METHOD OF POLYURETHANE PULTRUSION COMPOSITE MATERIAL

(71) Applicant: Covestro Deutschland AG, Leverkusen (DE)

(72) Inventors: Lily Tang, Shanghai (CN); James Chen, Shanghai (CN); Zhijiang Li, Shanghai (CN)

(73) Assignee: Covestro Deutschland AG, Leverkusen (DE)

( * ) Notice: Subject to any disclaimer, the term of this patent is extended or adjusted under 35 U.S.C. 154(b) by 799 days.

(21) Appl. No.: 16/060,757

(22) PCT Filed: Dec. 20, 2016

(86) PCT No.: PCT/EP2016/081875
§ 371 (c)(1),
(2) Date: Jun. 8, 2018

(87) PCT Pub. No.: WO2017/108757
PCT Pub. Date: Jun. 29, 2017

(65) Prior Publication Data
US 2018/0361687 A1    Dec. 20, 2018

(30) Foreign Application Priority Data

Dec. 23, 2015 (CN) .......................... 201511007485.8

(51) Int. Cl.
*B29C 70/52* (2006.01)
*B29C 70/54* (2006.01)
*B29K 309/08* (2006.01)
*B29K 75/00* (2006.01)

(52) U.S. Cl.
CPC ............ *B29C 70/521* (2013.01); *B29C 70/54* (2013.01); *B29K 2075/00* (2013.01); *B29K 2309/08* (2013.01)

(58) Field of Classification Search
CPC ....... B29C 70/521; B29C 70/52; B29C 55/30; B29C 50/526; B29C 70/526; B29C 70/527
See application file for complete search history.

(56) References Cited

U.S. PATENT DOCUMENTS

| | | | | |
|---|---|---|---|---|
| 5,627,230 A | * | 5/1997 | Weidner | B29C 70/525 524/306 |
| 5,824,403 A | * | 10/1998 | Eidenschink | B05D 1/045 428/300.4 |
| 6,185,962 B1 | | 2/2001 | Hartman et al. | |
| 8,343,601 B1 | * | 1/2013 | Ekin | C03C 17/322 428/34.7 |
| 2004/0106726 A1 | * | 6/2004 | Joshi | C08G 18/289 524/589 |
| 2013/0273369 A1 | | 10/2013 | Zhou et al. | |
| 2014/0170327 A1 | * | 6/2014 | Dombrowski | C08G 18/6511 427/388.1 |
| 2016/0167259 A1 | * | 6/2016 | Plagemann | B29C 48/06 428/141 |

FOREIGN PATENT DOCUMENTS

JP      2004341266      12/2004
WO      2014140424 A1   9/2014

OTHER PUBLICATIONS

International Search Report for PCT/EP2016/081875, dated Apr. 25, 2017.
Written Opinion of the International Searching Authority for PCT/EP2016/081875, dated Apr. 25, 2017.

* cited by examiner

*Primary Examiner* — Stella K Yi
(74) *Attorney, Agent, or Firm* — K&L Gates LLP

(57) ABSTRACT

The present invention relates to a method of coating a polyurethane pultrusion composite material, comprising: a) preparing a polyurethane pultrusion composite material by a polyurethane pultrusion process, the polyurethane pultrusion process comprising: impregnating a fiber reinforcing material with polyurethane resin, and then curing the impregnated fiber reinforcing material in a mold to provide a polyurethane pultrusion composite material; and b) drawing the polyurethane pultrusion composite material to leave the mold, and then on-line applying waterborne coating(s) to the polyurethane pultrusion composite material at a temperature ranging from 30 to 90° C. The method according to the present invention can achieve a good coating to the polyurethane pultrusion composite material.

8 Claims, No Drawings

COATING METHOD OF POLYURETHANE PULTRUSION COMPOSITE MATERIAL

CROSS-REFERENCE TO RELATED APPLICATIONS

This application is a U.S. national stage application, filed under 35 U.S.C. § 371, of International Application No. PCT/EP2016/081875, which was filed on Dec. 20, 2016, and which claims priority to Chinese Patent Application No. 201511007485.8, which was filed on Dec. 23, 2015, the contents of each are incorporated by reference into this specification.

TECHNICAL FIELD

The present invention relates to a method of coating a polyurethane pultrusion composite material, which applies coating(s) by choosing a suitable position on the polyurethane pultrusion composite material. In particular, the coating(s) are waterborne polyurethane coating(s). The method according to the present invention can provide a polyurethane pultrusion composite material having a good coating.

BACKGROUND

Polyurethane pultrusion composite materials have high tensile strengths and corrosion resistance, and thus are the best substitutes for steels in corrosive environments, and could be widely used in transportation, electrical engineering, electrics, electrical insulation, chemical engineering, mining, marine, ships and boats, corrosive environments as well as various fields for daily and civil use. Polyurethane pultrusion composite materials have the problem of insufficient weather resistance. In particular, in case of long-term outdoor exposure, the superficial resin layers of such materials tend to become pulverized and discolor, and even fibers are exposed, which would affect the appearance and performance of the polyurethane pultrusion composite materials.

Therefore, polyurethane pultrusion composite materials generally require coating. The existing coating method is carrying out in the manner that after the completion of molding of polyurethane pultrusion profiles, the coating protection to polyurethane pultrusion composite materials is applied via an off-line spraying production line process. The existing off-line spraying process has the shortcomings of low coating rate, too many coating steps, and time-consuming and labor-consuming, thus leading to the high coating cost. Moreover, the applicable coating(s) for the time being are mostly solvent-based products, which causes new environmental protection problems. Therefore, it has been a long time wish for a person skilled in the art to develop an on-line and environmental-friendly coating process.

The U.S. Pat. No. 5,492,583A discloses an apparatus and a method for on-line coating of pultrusion profiles. In said method, a coating die is added after a pultrusion die for on-line coating of pultrusion profiles, and a drying device is used for curing the coating. A cooling device is included in said die for surface-cooling of profiles before coating, and then ovens are used for curing. Since curing polyurethane pultrusion profiles at high temperatures would affect their size stability, this method is not applicable to polyurethane pultrusion profiles.

Therefore, there is still a need for an on-line coating process of polyurethane pultrusion profiles in the art.

SUMMARY OF THE INVENTION

The present invention provides a method of coating a polyurethane pultrusion composite material, the method comprising:
a) preparing a polyurethane pultrusion composite material by a polyurethane pultrusion process, the polyurethane pultrusion process comprising: impregnating a fiber reinforcing material with polyurethane resin, and then curing the impregnated fiber reinforcing material in a mold to provide a polyurethane pultrusion composite material; and
b) drawing the polyurethane pultrusion composite material to leave the mold, and then on-line applying at least one waterborne coating to the polyurethane pultrusion composite material at a temperature ranging from 30 to 90° C.

In one embodiment according to the present invention, the waterborne coating(s) are selected from the group consisting of waterborne polyurethane coating(s), waterborne fluoroolefin vinyl ether coating(s) and polyvinylidene fluoride coating(s). Preferably, the waterborne coating(s) are selected from two-component waterborne polyurethane coating(s). More preferably, the two-component waterborne polyurethane coating(s) have a surface drying time of 30 seconds to 30 minutes at room temperature or 30 seconds to 10 minutes at 50° C.

In another embodiment according to the present invention, the waterborne coating(s) are selected from one-component waterborne polyurethane coating(s). Preferably, the one-component waterborne polyurethane coating(s) have a surface drying time of 30 seconds to 10 minutes at room temperature or 30 seconds to 5 minutes at 50° C.

In another embodiment according to the present invention, the fiber reinforcing material is selected from the group consisting of glass fiber, carbon fiber, polyester fiber, natural fiber, aramid fiber, nylon fiber, basalt fiber, boron fiber, silicon carbide fiber, asbestos fiber, whisker, hard particles, metal fiber, or a combination of any thereof.

In another embodiment according to the present invention, the polyurethane pultrusion composite material is selected from the group consisting of polyurethane pultrusion tube chamber, bridge, antiglare plank, profile for door and window, frame of solar panel, fishplate, sleeper and goods shelf.

DETAILED DESCRIPTION

The present invention provides a method of coating a polyurethane pultrusion composite material. In said method, after the pultrusion profile leaves the mold, a suitable position is selected, and a waterborne coating is directly applied on it on-line. The coating could be cured naturally by the afterheat or by suitable heating, thus completing the coating of the pultrusion profile. The method provided herein is simple in operation, and can be directly applied to the pultrusion profile without the need of basecoat. The coating has good adhesion to the pultrusion profile.

The method according to the present invention comprises:
a) preparing a polyurethane pultrusion composite material by a polyurethane pultrusion process, the polyurethane pultrusion process comprising: impregnating a fiber reinforcing material with polyurethane resin, and then curing the impregnated fiber reinforcing material in a mold to provide a polyurethane pultrusion composite material; and
b) drawing the polyurethane pultrusion composite material to leave the mold, and then on-line applying at least one waterborne coating to the polyurethane pultrusion composite material at a temperature ranging from 30 to 90° C.

The polyurethane pultrusion process and polyurethane pultrusion composite material stated in step a) have a well-known meaning in the art. US patents, U.S. Pat. Nos. 3,960,629 and 4,935,279, disclose polyurethane pultrusion processes, and the whole contents of these two patents are incorporated herein by reference. In polyurethane pultrusion processes, generally, glass fibers are taken out from a creel, go through a yarn guide plate, enter a glue injection cassette, and pass through a mold cavity. The glass fiber yarns passing through the mold cavity are drawn by a drawing device to get smooth. A polyurethane pultrusion process can comprise starting a mold heating system and a cooling system at a mold outlet. A polyurethane pultrusion process can comprise starting the glue injection machine and pumping resin into the glue injection cassette to dip the fiber yarns thoroughly. The fiber yarns dipped by the resin in the glue injection cassette are continuously drawn through the mold by the drawing device, and the resin fibers are gradually cured when passing through the heated mold, and are then further drawn out of the mold to form the continuous polyurethane pultrusion composite materials. These materials are cut to obtain the polyurethane pultrusion composite material.

The fiber reinforcing material useful in the present invention is selected from the group consisting of glass fiber, carbon nanotube, carbon fiber, polyester fiber, natural fiber, aramid fiber, nylon fiber, basalt fiber, boron fiber, silicon carbide fiber, asbestos fiber, whisker, hard particle, metal fiber, or a combination of any thereof. In certain preferred embodiments according to the present invention, said reinforcing material is selected from the group consisting of glass fiber. The content of said reinforcing material is 60-85 wt. %, based on the total weight of the polyurethane pultrusion composite material being 100 wt. %.

In step b), the polyurethane pultrusion composite material obtained from step a) is further drawn out of the mold, and then proceeds along with the drawing direction. In the polyurethane pultrusion process, the temperature of the mold is usually divided into three zones, wherein the temperature in zone 1 is 60-140° C.; the temperature in zone 2 is 160-190° C.; the temperature in zone 3 is 150-190° C. The continuous profile has the temperature of 80-150° C. upon being drawn out of the mold. During the process of proceeding along with the drawing direction, the temperature of the profile may decrease naturally, or decrease rapidly by means of blowing air or the like.

The portion where the temperature is from 30 to 90° C. is selected from the continuous polyurethane pultrusion composite material, and a waterborne coating is applied on-line at this portion. The waterborne coating is rapidly cured under the afterheat, thus coating the profile. In certain embodiments according to the present invention, the portion where the temperature is from 40 to 80° C. is selected from the continuous polyurethane pultrusion composite material to be applied with the waterborne coating. Said waterborne coating can be applied to the polyurethane pultrusion composite material by use of conventional manners in the art, for example, spin-coating method, knife coating, microgravure coating method, direct intaglio coating method, gravure offset printing method, reverse gravure method, reverse roll coating method, rod coating, mould coating method, spraying method, or dip-coating method.

The waterborne coating useful in the present invention is selected from the group consisting of fluoro-olefin vinyl ether (FEVE) coating(s), polyvinylidene fluoride (PVDF) coating(s) and polyurethane coating(s). In preferred embodiments according to the present invention, the waterborne coating useful in the present invention is selected from polyurethane coating(s). When such waterborne coating(s) are used in the present invention, they have a good adhesion to profile without the need of basecoat. After the application of the waterborne coating, curing may be performed at room temperature to achieve the coating to the profile, or the coating may be cured at elevated temperatures.

The waterborne polyurethane coating useful in the present invention may be a two-component coating having a solid content of 10%-70%, preferably 20%-60%, wherein the viscosity range after mixing component A with component B is 10 seconds to 10 minutes with DIN4 cup, preferably 10 seconds to 3 minutes with DIN4 cup; the surface drying time is 1 to 30 minutes at room temperature or 30 seconds to 10 minutes at 50° C.

The waterborne polyurethane coating useful in the present invention may be a one-component waterborne polyurethane coating having a solid content of 30%-60%, preferably 35%-55%, a viscosity of 5-500 mpa·s, preferably 20-200 mpa·s at room temperature, and a surface drying time of 30 seconds to 10 minutes at room temperature or 30 seconds to 5 minutes at 50° C.

The coated polyurethane pultrusion composite material is drawn to the cutting device and is cut into the desired length so as to prepare the desired coated polyurethane pultrusion composite materials.

In the embodiments according to the present invention, the polyurethane pultrusion composite material is selected from the group consisting of polyurethane pultrusion tube chamber, bridge, antiglare plank, profile for door and window, frame of solar panel, fishplate, sleeper and goods shelf.

Examples 262 glass fiber yarns CPIC469P-2400Tex and 2 glass fiber knitted felts EMC of 300 g/m², each for the upper side and lower side, were taken out from the creel, went through the yarn guide plate of 3-stages, entered the glue injection cassette, and passed through the mold cavity. The glass fiber yarns passing through the mold cavity were tied tightly by a drawing rope and drawn forwardly by a tracked drawing device until the yarns were fully drawn smooth. The mold heating system was started to heat the mold, while starting the die orifice cooling system at the same time. The mold temperature was controlled from inlet to outlet as: 20° C./60° C./190° C./170° C. The glue injection machine was started to continuously pump the polyurethane resin to the static mixing head. After mixing by the mixing head, the glue injection cassette was filled up, while the fiber yarns were dipped thoroughly. The fiber yarns dipped by the glue injection cassette were continuously drawn through the mold by the tracked drawing device, and cured by the heated mold to become panels, and then continuously drawn out of the mold.

The profile temperature was around 80-90° C. at 1.1 m to 1.2 m from mold outlet. A roller was used to coat the coating, and the coating adhesion was tested after 7 days. The environmental temperature was 13° C.; humidity was 56RH %; the drawing speed of production line was 0.65 m/min. The coating was a two-component waterborne polyurethane coating, wherein component A was Bayhydrol XP 2546 or 2542, and component B was Bayhydrur XP2547, commercially available from Covestro Deutschland AG. For comparison, the coating method was repeated with a different coating: FC-W200, a two-component fluorocarbon coating, commercially available from Shanghai Hengfeng Fluorocarbon Material Co., Ltd.

Coating adhesion was tested for the obtained articles in accordance with GBT9286-1998. A hundred-grid method was used to test the adhesion of the coating to the composite material. The rating standard for the test results of the numerals 0 to 5 were shown in Table 1. In this method, 100 grids of squares of 10*10 were formed on a sample plate by a hundred-grid knife, and then a transparent force-sensitive tape was adhered to the squares, and then the tape was torn off by transient force. The peel-off area was recorded and provided with rating by the standards given in Table 1.

The test result for the adhesion of the two-component waterborne polyurethane coating was 0. The test result for the adhesion of the fluorocarbon coating was 5. Thus it can be seen that the utilization of the method according to the present invention can realize the good coating of polyurethane pultrusion profiles. Particularly, the coating was better in case of waterborne polyurethane coating.

TABLE 1

Meanings of Test Results of Hundred-Grid Method

| Rating | Phenomenon Description |
|---|---|
| 0 | very smooth at the edges of notches; no peeling at the edges of grids |
| 1 | peeling at the intersections of notches in small flakes; the actual damages within the grid zone of less than or equal to 5% |
| 2 | peeling at the edges and/or intersections of notches in areas of greater than 5%-15% |
| 3 | peeling at the edges of notches partially or entirely, or at some grids entirely; the peeling area exceeds 15%-35% |
| 4 | peeling at the edges of notches in large flakes or at some square grids entirely; the area is larger than that of the grid zone by 35%-65% |
| 5 | paint peeling in flakes at the edges and intersections of lines in a total area of greater than 65% |

The invention claimed is:

1. A method of coating a polyurethane pultrusion composite material, comprising:
   a) preparing a polyurethane pultrusion composite material by a polyurethane pultrusion process, the polyurethane pultrusion process comprising: impregnating a fiber reinforcing material with polyurethane resin, and then curing the impregnated fiber reinforcing material in a mold to provide a polyurethane pultrusion composite material; and
   b) drawing the polyurethane pultrusion composite material to leave the mold, and then on-line applying at least one waterborne coating directly to the drawn polyurethane pultrusion composite material at a temperature ranging from 30 to 90° C.

2. The method according to claim 1, wherein the at least one waterborne coating is selected from the group consisting of a waterborne polyurethane coating, a waterborne fluoro-olefin vinyl ether coating, and a polyvinylidene fluoride coating.

3. The method according to claim 2, wherein the at least one waterborne coating comprises a two-component waterborne polyurethane coating.

4. The method according to claim 3, wherein the two-component waterborne polyurethane coating has a surface drying time of 30 seconds to 30 minutes at room temperature or 30 seconds to 10 minutes at 50° C.

5. The method according to claim 2, wherein the at least one waterborne coating comprises a one-component waterborne polyurethane coating.

6. The method according to claim 5, wherein the one-component waterborne polyurethane coating has a surface drying time of 30 seconds to 10 minutes at room temperature or 30 seconds to 5 minutes at 50° C.

7. The method according to claim 1, wherein the fiber reinforcing material is selected from the group consisting of glass fiber, carbon fiber, polyester fiber, natural fiber, aramid fiber, nylon fiber, basalt fiber, boron fiber, silicon carbide fiber, asbestos fiber, whisker, hard particle, metal fiber, and a combination of any thereof.

8. The method according to claim 1, wherein the polyurethane pultrusion composite material is selected from the group consisting of polyurethane pultrusion tube chamber, bridge, antiglare plank, profile for door and window, frame of solar panel, fishplate, sleeper and goods shelf.

* * * * *